US007979882B2

(12) United States Patent
Choi et al.

(10) Patent No.: US 7,979,882 B2
(45) Date of Patent: Jul. 12, 2011

(54) APPARATUS AND METHOD FOR PROVIDING A DIGITAL MULTIMEDIA BROADCASTING (DBM) SERVICE TO A TERMINAL COMMUNICABLE WITH DIFFERENT COMMUNICATION NETWORKS

(75) Inventors: Joon-Young Choi, Suwon-si (KR); Jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 11/983,643

(22) Filed: Nov. 9, 2007

(65) Prior Publication Data

US 2008/0115184 A1 May 15, 2008

(30) Foreign Application Priority Data

Nov. 9, 2006 (KR) .......................... 10-2006-110510

(51) Int. Cl.

| | |
|---|---|
| ***H04N 7/16*** | (2011.01) |
| ***H04N 7/20*** | (2006.01) |
| *H04N 7/173* | (2011.01) |
| *H04N 7/00* | (2011.01) |
| *H04M 1/56* | (2006.01) |

(52) U.S. Cl. .............. 725/62; 725/63; 725/73; 725/111; 379/142.16

(58) Field of Classification Search .................... 725/62, 725/63, 73, 111; 379/142.16; 348/552
See application file for complete search history.

(56) References Cited

U.S. PATENT DOCUMENTS

| | | | |
|---|---|---|---|
| 5,852,474 A | 12/1998 | Nakagaki et al. |
| 2006/0117345 A1 | 6/2006 | Ito |

FOREIGN PATENT DOCUMENTS

| | | | |
|---|---|---|---|
| EP | 1 455 470 A2 | 9/2004 |
| KR | 10-2006-0005250 * | 1/2006 |
| KR | 1020060005250 A | 1/2006 |
| KR | 10-2006-0032892 * | 4/2006 |
| KR | 1020060032892 A | 4/2006 |

OTHER PUBLICATIONS

Office Action dated Jan. 11, 2010 in connection with Korean Patent Application No. 10-2006-0110510.
European Search Report dated Sep. 15, 2010 in connection with European Patent Application No. 07 02 1780.

* cited by examiner

*Primary Examiner* — Hoang-Vu A Nguyen-Ba

(57) ABSTRACT

A method for providing a Digital Multimedia Broadcasting (DMB) service to a terminal communicable with different communication networks. The DMB service method includes receiving a broadcasting program over a DMB network; receiving the broadcasting program over a Wireless Broadband (WiBro) network upon failure to receive the broadcasting program signal from the DMB network; and upon receipt of the broadcasting program signal back from the DMB network, interrupting the broadcasting program received from the WiBro network and receiving the broadcasting program over the DMB network.

6 Claims, 7 Drawing Sheets

APPARATUS AND METHOD FOR PROVIDING A DIGITAL MULTIMEDIA BROADCASTING (DBM) SERVICE TO A TERMINAL COMMUNICABLE WITH DIFFERENT COMMUNICATION NETWORKS

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 9, 2006 and assigned Serial No. 2006-110510, the disclosure of which is incorporated herein by reference.

TECHNICAL FIELD OF THE INVENTION

The present invention relates generally to broadcasting services, and in particular, to an apparatus and method for providing seamless digital broadcasting services economical for the user by interworking between heterogeneous networks.

BACKGROUND OF THE INVENTION

Digital broadcasting refers to the broadcasting service that provides users with high-definition, high-fidelity and high-quality broadcastings, in replacement of the conventional analog broadcasting. With the recent development of the digital broadcasting and mobile communication technologies, there is an increasing interest in the study for allowing the users to view the digital broadcasting even while traveling by a vehicle or walking.

Such digital broadcasting is serviced by Digital Multimedia Broadcasting (DMB). For example, in South Korea, DMB is classified into satellite DMB which is serviced throughout the country on a charge basis, and terrestrial DMB which is serviced in the capital area including Seoul on a free-of-charge basis. In IEEE 802.16-based Wireless Broadband (WiBro) or Mobile Worldwide Interoperability for Microwave Access (Mobile WiMAX), IEEE 802.11-based Wireless LAN, and 3rd Generation (3G), intensive discussions are being held on Broadcasting/Communication Convergence in which the digital broadcasting services are available over the communication networks, such as Wideband Code Division Multiple Access (WCDMA), Universal Mobile Telecommunications System (UMTS) and High Speed Downlink Packet Access (HSDPA) by the 3rd Generation Partnership Project (3GPP) group, and CDMA 2000, 1x Evolution Data Only (EVDO) and 1x Evolution Data and Voice (EVDV) by the 3rd Generation Partnership Project 2 (3GPP2) group.

Under the assumption that the above heterogeneous networks coexist, consideration is given to the scheme capable of supporting the networks by means of dual-mode terminals, each of which is equipped with separate modems capable of receiving services of the networks. Actually, a product made by realizing DMB and WiBro in a single terminal is under the study.

Therefore, when one terminal receives the digital broadcasting service in the heterogeneous network environment where the multiple networks coexist, it is important for the terminal to know how to access each network and communicate with it in providing effective, economical broadcasting service to the user. In particular, the broadcasting service should be provided such that the user may view all broadcasting program content without missing any, even when a moving terminal can no longer receive the broadcasting service if it enters a no-service area (such as a shadow area) while the user views the broadcasting program.

Nevertheless, conventionally, there is no detailed method in which a moving terminal can seamlessly access the heterogeneous networks and communicate with them at a low price when the moving terminal is disconnected from the terrestrial or satellite DMB network as it enters an area where it cannot receive the digital broadcasting service. In particular, no consideration is given to the method in which even though the terminal receives again the digital broadcasting service as it moves back to the DMB service area after a lapse of a predetermined time, the user can conveniently view his or her missing broadcasting content.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide an apparatus and method capable of effectively receiving a digital broadcasting service with one terminal in an environment where multiple heterogeneous networks coexist.

Another aspect of the present invention is to provide an apparatus and method in which a moving terminal that is disconnected from a network from which it was receiving a digital broadcasting service accesses another heterogeneous network to seamlessly receive the service in an environment where multiple heterogeneous networks coexist.

Another aspect of the present invention is to provide an apparatus and method in which a moving terminal that fails to receive a broadcasting service from an existing DMB network may access a WiBro network to seamlessly receive the service.

Another aspect of the present invention is to provide an apparatus and method in which a moving terminal that fails to receive a broadcasting service from the existing DMB network recognizes a program time period during which it is disconnected from the DMB network to allow the user to view the broadcasting program from the disconnected time when the terminal later re-accesses the WiBro network.

Another aspect of the present invention is to provide an apparatus and method in which, when a moving terminal fails to receive a broadcasting service from the existing DMB network, the terminal allows the user to view all broadcasting program content without missing any, using the program time period during which it was disconnected from the DMB network and the program time period during which it was disconnected from a WiBro network, when the terminal later returns back to the DMB network after accessing the WiBro network.

Another aspect of the present invention is to provide an apparatus and method in which a moving terminal that fails to receive a broadcasting service from the existing DMB network allows the viewer to download the missing partial broadcasting program from a WiBro network when the terminal returns back to the DMB network after receiving the broadcasting service from the WiBro network.

According to one aspect of the present invention, there is provided an apparatus for providing a Digital Multimedia Broadcasting (DMB) service to a terminal communicable with different communication networks. The DMB service apparatus includes a DMB modem for reproducing a broadcasting program received from a DMB network; a Wireless Broadband (WiBro) modem for reproducing the broadcasting program received from a WiBro network; a display unit for displaying the broadcasting program; and a memory for storing therein a part of the broadcasting program that a user has failed to view as the apparatus has failed to receive the program from the DMB network, wherein the missing part of the broadcasting program is downloaded from the WiBro network.

According to another aspect of the present invention, there is provided a method for providing a Digital Multimedia Broadcasting (DMB) service to a terminal communicable with different communication networks. The DMB service method includes receiving a broadcasting program over a DMB network; receiving the broadcasting program over a Wireless Broadband (WiBro) network upon failure to receive the broadcasting program signal from the DMB network; and upon receipt of the broadcasting program signal back from the DMB network, interrupting the broadcasting program received from the WiBro network and receiving the broadcasting program over the DMB network.

Before undertaking the DETAILED DESCRIPTION OF THE INVENTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
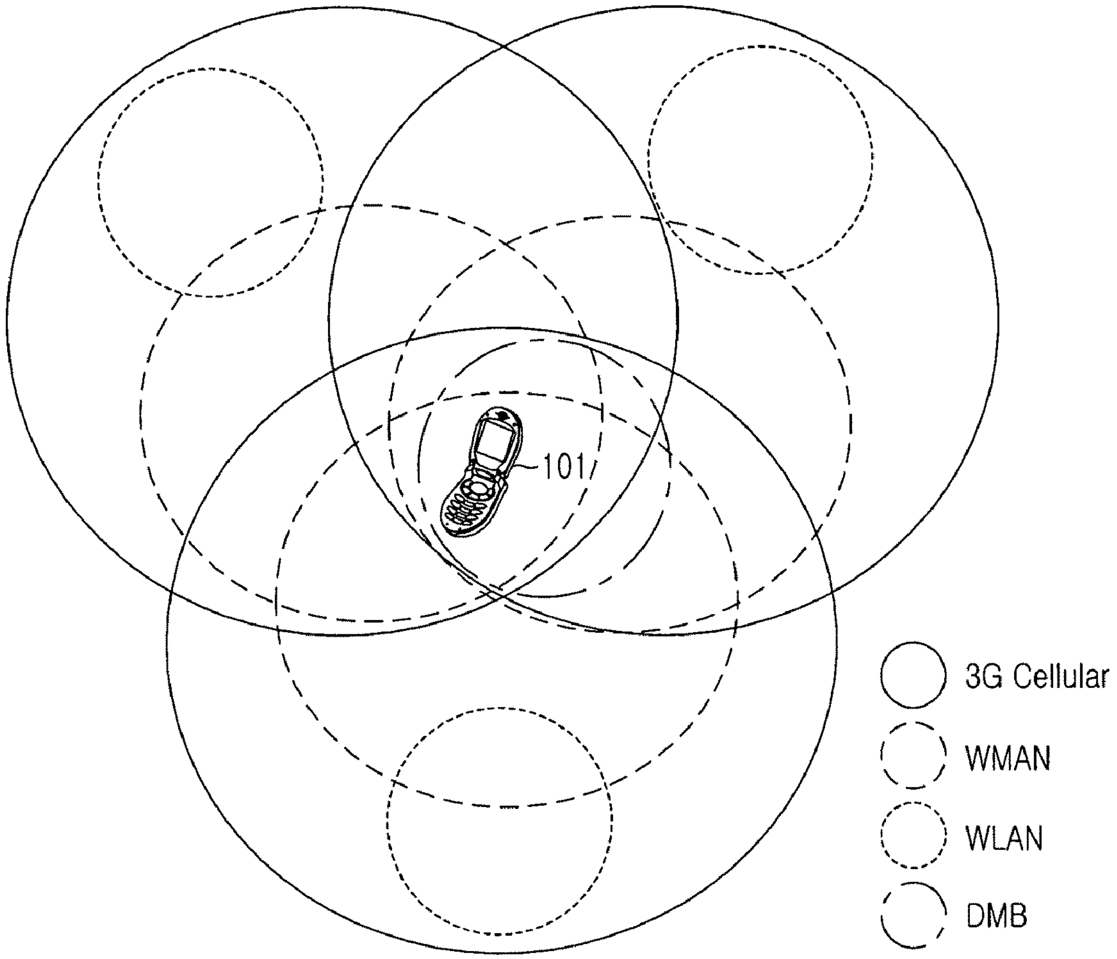
FIG. 1 illustrates a radio access environment where various communication networks coexist.

FIG. 1 illustrates a radio access environment where various communication networks coexist. As shown in the drawing, a terminal (or mobile station) 101 can access not only the DMB network but also the 3G cellular network, the WiBro network (or Wireless Metropolitan Area Network (WMAN)) network and the WLAN network. The terminal 101, although it can access several communication networks, generally accesses the DMB system most suitable to provide free or low-priced broadcasting services, and receives therefrom various content, such as sports, movies, television shows, and music programs. An embodiment of the present invention is also applied to this environment.

Figure 2:
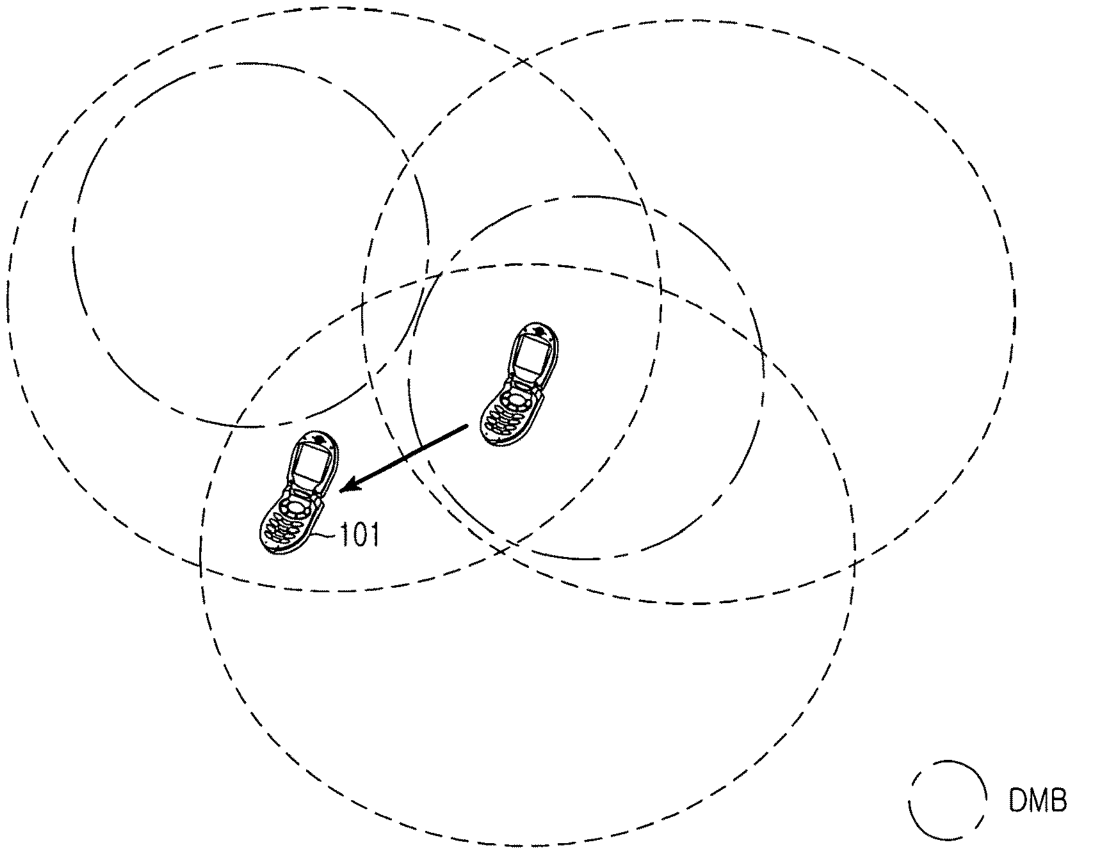
FIG. 2 illustrates a terminal that receives a broadcasting service over a WiBro network according to an embodiment of the present invention.

FIG. 2 illustrates a terminal that receives a broadcasting service over a WiBro network according to an embodiment of the present invention. Particularly shown in FIG. 2 is the case where the terminal 101, receiving the broadcasting service over the DMB network in FIG. 1, is disconnected from the DMB network and accesses a heterogeneous network as it moves on. In this case, the terminal 101, as it is out of the DMB network area, should select one of the several heterogeneous networks shown in FIG. 2 and continuously receive the broadcasting service from the selected network. Although, herein, the terminal 101 accesses the WiBro network which is known as a network most suitable for the wireless Internet service, by way of example, the terminal 101 can access other networks such as 3G cellular network, WLAN, and the like, when necessary.

Figure 3:
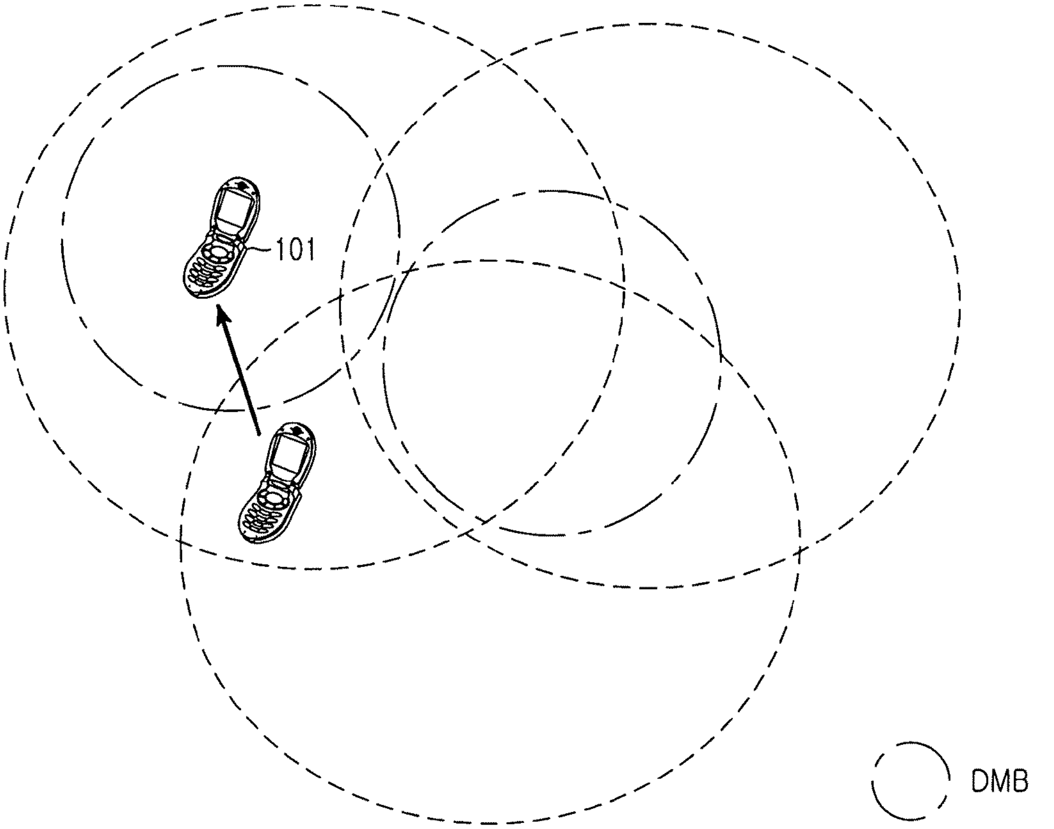
FIG. 3 illustrates a terminal that re-accesses a DMB network according to an embodiment of the present invention.

FIG. 3 illustrates a scenario where the terminal of FIG. 2 re-accesses the DMB network as it moves back thereto, according to an embodiment of the present invention. It is preferable and economical that the terminal 101, when it can receive the broadcasting service over the DMB network, disconnects its connection with the WiBro network and re-accesses the DMB system to receive the broadcasting service therefrom.

Figure 4:
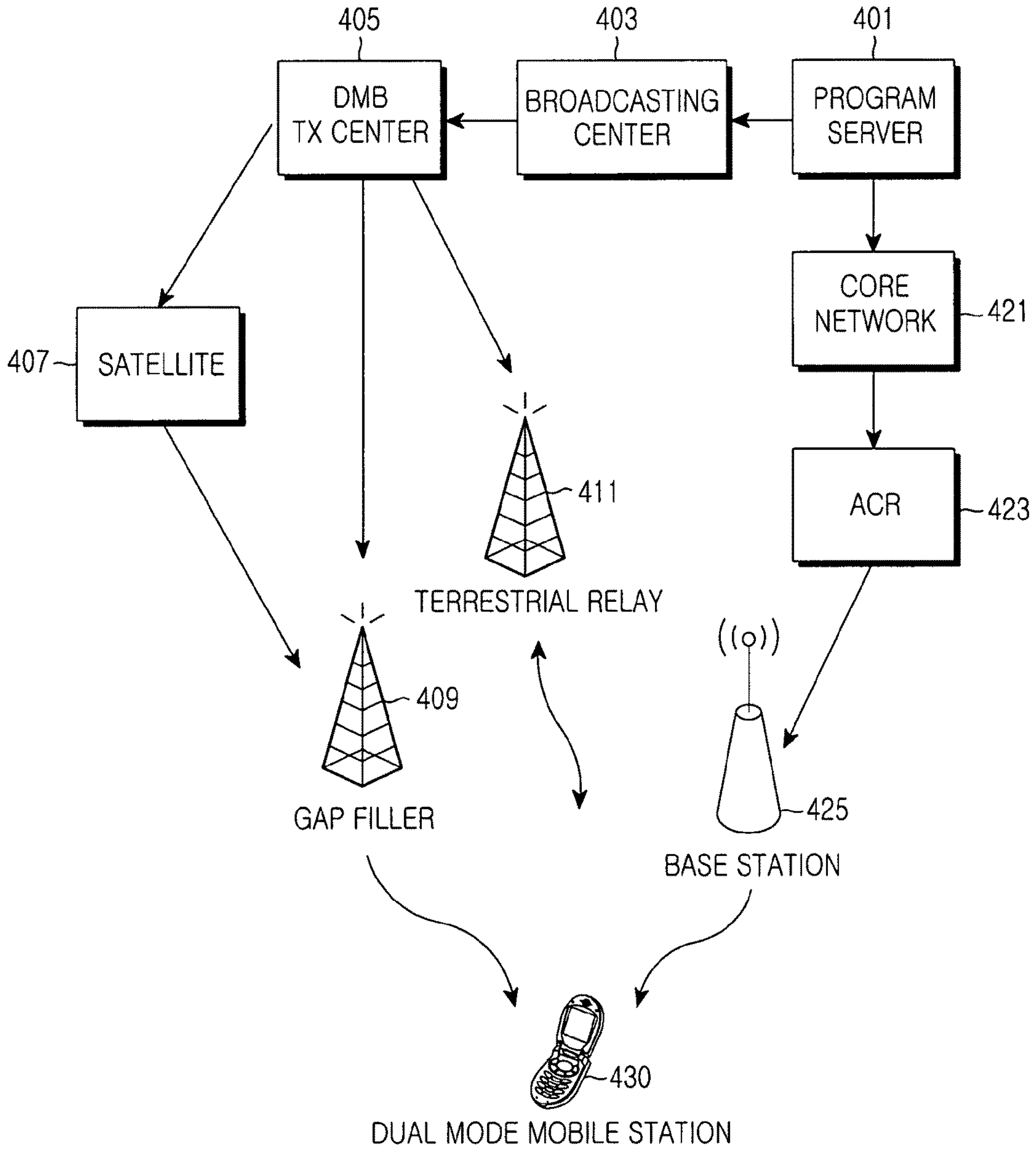
FIG. 4 illustrates a system configuration capable of providing a broadcasting service over a satellite/terrestrial DMB network and a WiBro network according to an embodiment of the present invention.

FIG. 4 illustrates a system configuration capable of providing a broadcasting service over a satellite or terrestrial DMB network and a WiBro network according to an embodiment of the present invention. A program server 401 provides such programs as sports, music, concert, movie, television shows, and the like. For the satellite DMB, the user of a terminal 430 (e.g., dual-mode mobile station 430) can view the provided programs via a broadcasting center 403, a DMB transmission center 405, and a satellite 407. When the terminal 430 is located in the shadow area, it receives the broadcasting service via a gap filler 409. The terrestrial DMB, though similar to the satellite DMB, is different in that it does not provide the broadcasting service over the satellite 407. That is, the terrestrial DMB provides the broadcasting service via the broadcasting center 403, the DMB transmission center 405, and a terrestrial relay 411.

The user of the terminal 430 can view the program even over the WiBro network. The user can view the program from the program server 401 through a core network 421, an access control router (ACR) 423, and a base station (BS) 425. To access both the DMB network and the WiBro network, the terminal 430 should be a dual-mode terminal. Therefore, the terminal 430, as it can access both the DMB network and the WiBro network, can view (or receive) the broadcasting program if it can access the base station 425 of the WiBro network even though it cannot receive the program from the DMB network in the poor reception area, like in the shadow area.

Figure 5A:
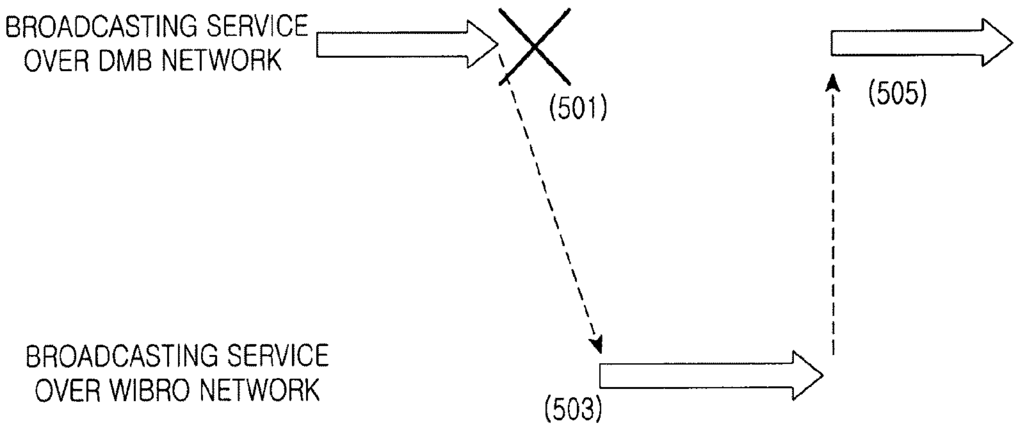
FIGS. 5A and 5B illustrate detailed operations in which a terminal receives a broadcasting program over a satellite/terrestrial DMB network and a WiBro network according to an embodiment of the present invention.
Figure 5B:
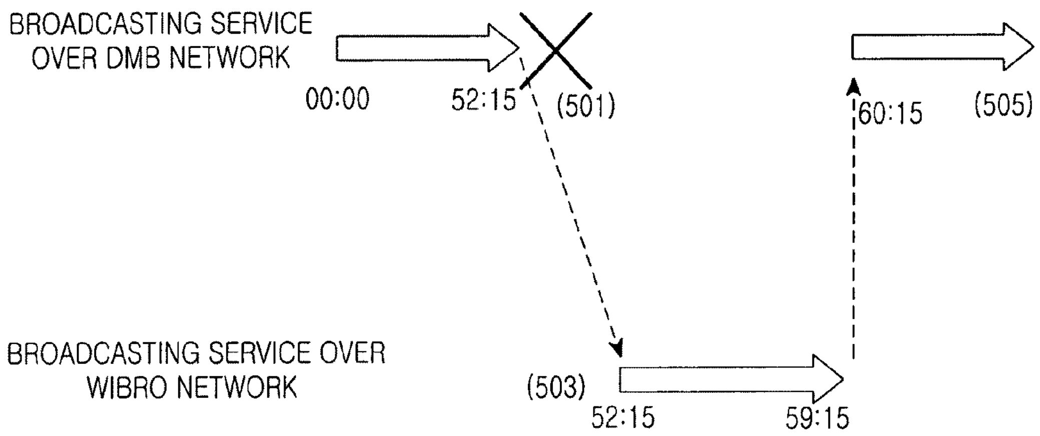

FIGS. 5A and 5B illustrate detailed operations in which a terminal receives a broadcasting program over a satellite or terrestrial DMB network and a WiBro network according to an embodiment of the present invention. Specifically, FIG. 5A illustrates a process of accessing a DMB network and/or a WiBro network and re-accessing the DMB network according to the broadcasting program procedure. The terminal, while viewing (receiving) the broadcasting from the DMB network, enters the area where it cannot receive signals from the DMB network (see 501). Upon failure to access the DMB network for a predetermined time, the terminal searches for a network having the same contents as the broadcasting service (i.e., searches for a WiBro network). In this case, the terminal stores the time at which it has last received the broadcasting program from the DMB network. This time can be a specific time that has elapsed after the start of a particular program. Thereafter, if the terminal accesses the WiBro network, it receives the program from the stored time (see 503). If the terminal can access the DMB network while periodically monitoring whether its access to the DMB network is available, the terminal receives and views again the broadcasting program from the DMB network (see 505). In this manner, the user of the terminal can view the seamless broadcasting program.

FIG. 5B illustrates a detailed solution for a partial service drop (or service disconnection) occurring while the terminal receives the broadcasting service in FIG. 5A. After the connection with the DMB network is disconnected (see 501), the terminal may access the WiBro network after a lapse of quite a long time, or in the worst case, may fail to make the access for a long time. In this case, the terminal stores the time at which it has last received the program from the DMB network (i.e., stores the time that has elapsed after the start of a particular program). Herein, the last received time is assumed to be 52:15. Thereafter, the terminal accesses the WiBro network and receives therefrom the program from the last received time (see 503). If the terminal can access the DMB network while periodically monitoring whether its access to the DMB network is available, the terminal receives and views again the broadcasting program from the DMB network (see 505). In this case, however, the user of the terminal, when he or she re-accesses the DMB network, may not view the broadcasting program corresponding to the specific time for which it could not access both the DMB network and the WiBro network, if the specific time is longer than or equal to a predetermined time. Referring to the drawing, if the terminal takes one minute in accessing the WiBro network after disconnecting the DMB network, the user may not view the program contents for one minute when later returning back to the DMB service. Herein, the non-viewable time corresponds to the time between 59:15 and 60:15 after the start of the program. In this case, the terminal stores the time (59:15) at which it was disconnected from the WiBro network and the time (60:15) at which it has returned to the DMB network. The terminal downloads the 1-minute broadcasting contents from the WiBro network at any downloadable time and stores the downloaded contents in a memory. Thereafter, the terminal can play back the 1-minute content at any user-viewable time.

Figure 6:
FIG. 6 illustrates a display screen of a terminal according to an embodiment of the present invention.

FIG. 6 illustrates a display screen of a terminal according to an embodiment of the present invention. The terminal stores its missing broadcasting contents (described in FIG. 5B) in the memory. The user can view the stored broadcasting contents at his or her convenient time (i.e., at the broadcasting time of the advertisements or less interesting programs). As shown in the drawing, if the terminal has at least two display screens, its user can view the missing part even during the progression of the program.

Figure 7:
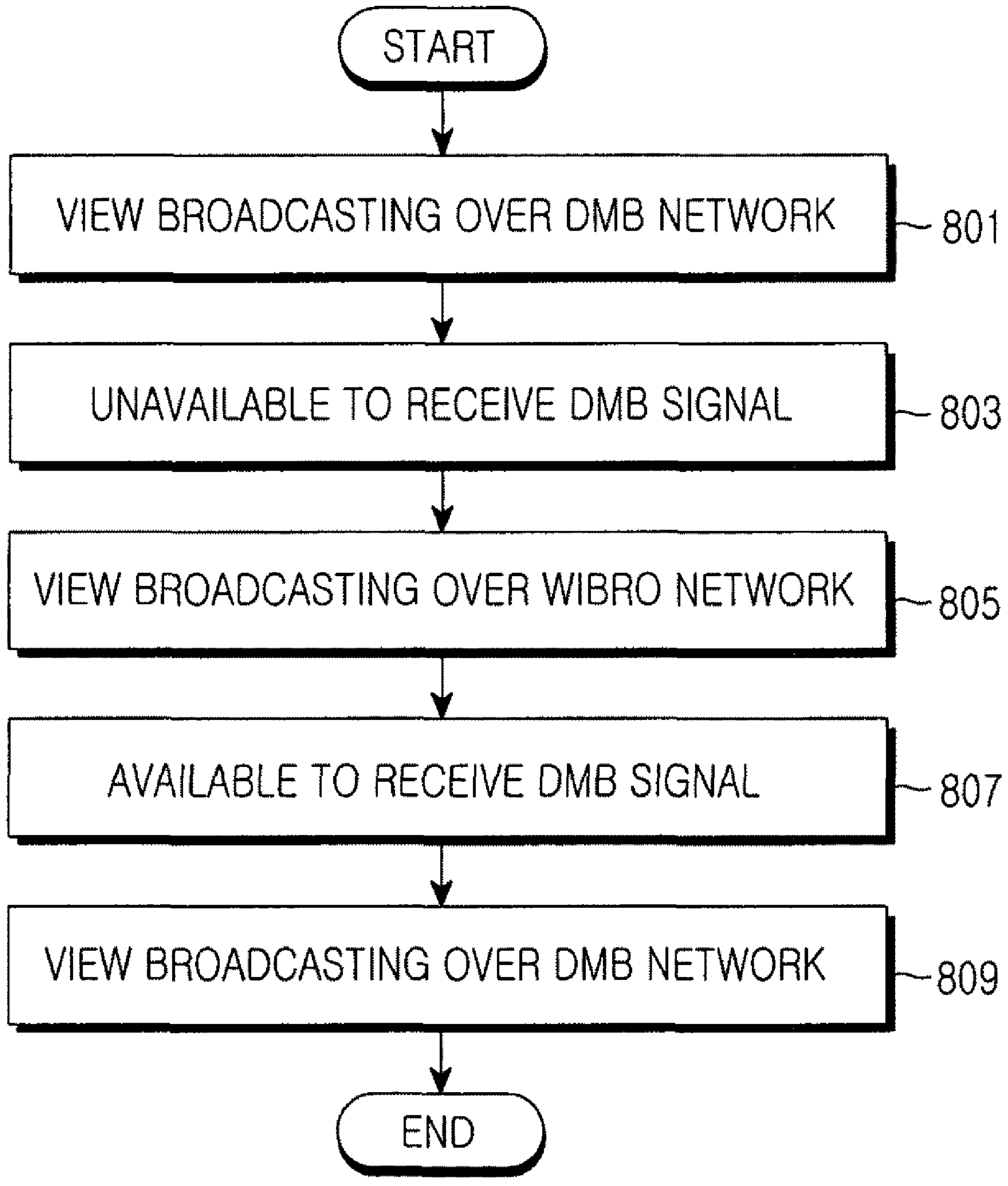
FIG. 7 illustrates an operation of a terminal according to an embodiment of the present invention.

FIG. 7 illustrates an operation of a terminal according to an embodiment of the present invention. If the terminal, while viewing the broadcasting over the DMB network in step 801, cannot receive the DMB broadcasting signal in step 803 as it moves on, the terminal searches for a WiBro network from which the same broadcasting program is provided and views the broadcasting over the WiBro network in step 805. If the terminal can access the DMB network in step 807 while monitoring availability of the DMB signal periodically or at a predetermined time, the terminal receives the broadcasting program from DMB network again in step 809.

As is apparent from the foregoing description, according to the present invention, in the service environment where multiple wireless communication systems coexist, the terminal can receive the seamless broadcasting service. In particular, the moving terminal can receive the broadcasting service over the WiBro network even when it cannot receive the DMB broadcasting signal, so the user can view all broadcasting content without missing them.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for providing a Digital Multimedia Broadcasting (DMB) service to a terminal communicable with different communication networks, the apparatus comprising:

a modem for the DMB service configured to reproduce a broadcasting program received from a DMB network;

a modem for a wireless broadband network configured to reproduce the broadcasting program received from the wireless broadband network;

a display unit configured to display the broadcasting program; and a memory configured to store therein a part of the broadcasting program that a user has failed to view as the apparatus has failed to receive the program from the DMB network, wherein the missing part of the broadcasting program is downloaded from the wireless broadband network, wherein the memory is configured to store a first time at which the terminal is disconnected from the DMB network, and to receive the broadcasting program over the wireless broadband network starting from the first time, wherein, when a specific time during which the terminal cannot access both the DMB network and the wireless broadband network is longer than or equal to a predetermined time, the memory is configured to store a second time at which the terminal is disconnected from the wireless broadband network and a third time at which the terminal returned to the DMB network, and wherein the terminal is configured to download contents provided from the second time to the third time among the broadcastingprogram provided through the wireless broadband network at any downloadable time, and to store the downloaded contents in the memory.

2. The apparatus of claim 1, wherein the display unit is configured to simultaneously display the broadcasting program received from the DMB network and the partial broadcasting program stored after being downloaded from the wireless broadband network.

3. The apparatus of claim 1, wherein the memory is configured to store a disconnected time at which an access to the wireless broadband network is disconnected when re-access to the DMB network is made.

4. A method for providing a Digital Multimedia Broadcasting (DMB) service to a terminal communicable with different communication networks, the method comprising:

receiving a broadcasting program over a DMB network;

receiving the broadcasting program over a Wireless Broadband network upon failure to receive the broadcasting program signal from the DMB network;

upon receipt of the broadcasting program signal back from the DMB network, interrupting the broadcasting program received from the wireless broadband network and receiving the broadcasting program over the DMB network;

upon failure to receive the broadcasting program signal from the DMB network, storing a first time at which the terminal is disconnected from the DMB network;

receiving the broadcasting program over the wireless broadband network starting from the first time, and reproducing the received broadcasting program;

storing a second time at which an access to the wireless broadband network is disconnected when re-access to the DMB network is made;

storing a third time at which the terminal is disconnected from the wireless broadband network and a fourth time at which the terminal returned to the DMB network when a specific time during which the terminal cannot access both the DMB network and the wireless broadband network is longer than or equal to a predetermined time; and downloading contents provided from the third time to the fourth time among the broadcasting program provided through the wireless broadband network at any downloadable time, and storing the downloaded contents in the memory.

5. The method of claim 4, further comprising:

upon receipt of the broadcasting program signal back from the DMB network, downloading from the wireless broadband network a part of the broadcasting program that a user has failed to view.

6. The method of claim 5, further comprising:

upon receipt of the broadcasting program signal back from the DMB network, simultaneously displaying the broadcasting program received from the DMB network and the partial broadcasting program stored after being downloaded from the wireless broadband network. network.

* * * * *